2 Sheets--Sheet 1

GIDEON BANTZ.

Improvement in Boiler Furnaces for Burning Wet Fuel.

No. 4,731. Reissued Feb. 6, 1872.

WITNESSES:

Wm. J. Peyton,

John G. Trine

INVENTOR.

Gideon Bantz, by Johnson, Hancock &c.

his Attorneys

2 Sheets--Sheet 2.

GIDEON BANTZ.

Improvement in Boiler Furnaces for Burning Wet Fuel.

No. 4,731. Reissued Feb. 6, 1872.

WITNESSES:

Wm. J. Peyton,

John G. Seine

INVENTOR.

Gideon Bantz, by Johnson, Klaucke & Co.

his Attorneys

UNITED STATES PATENT OFFICE.

GIDEON BANTZ, OF FREDERICK, MARYLAND.

IMPROVEMENT IN BOILER-FURNACES FOR BURNING WET FUEL.

Specification forming part of Letters Patent No. 20,616, dated June 22, 1858; reissue No. 4,731, dated February 6, 1872.

*To all whom it may concern:*

Be it known that I, GIDEON BANTZ, of Frederick City, in the county of Frederick and State of Maryland, have invented a new and useful Improvement in Furnaces for Burning Wet Fuel: and I do hereby declare that the following is a full, clear, and exact description of the same, reference being had to the accompanying drawing forming a part of this specification, and in which—

Figure 1:
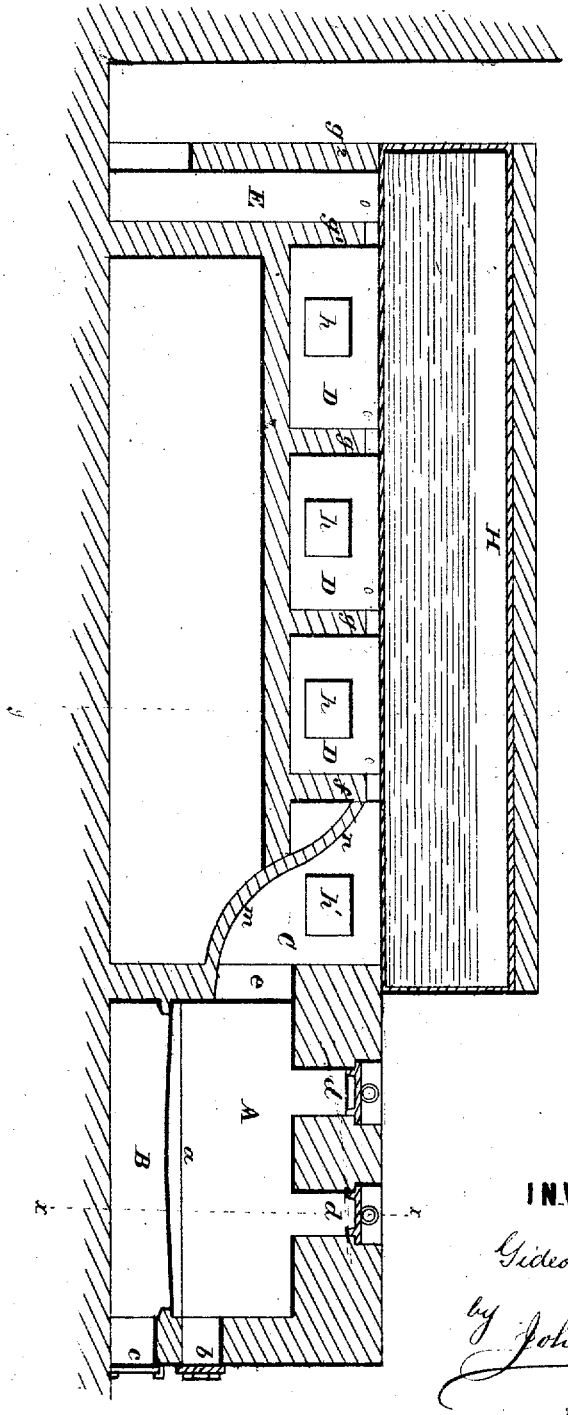
Figure 2:
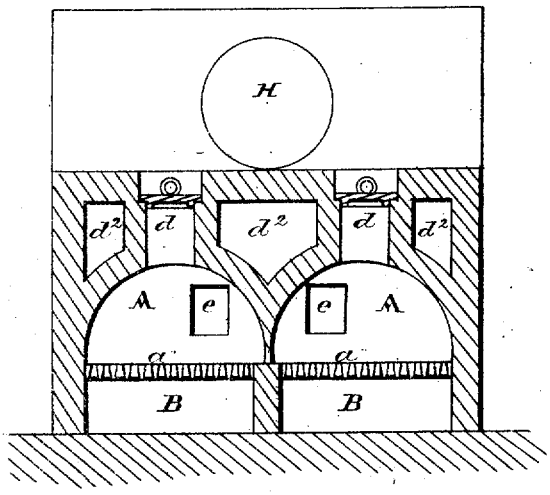
Figure 3:
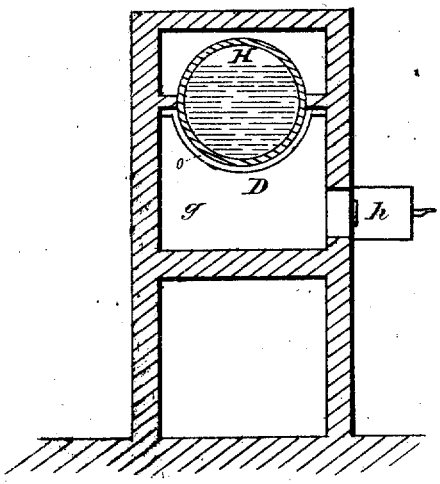

Figure 1 represents a longitudinal vertical section of a furnace embracing my invention, and showing its application to a steam-boiler. Fig. 2 represents a transverse vertical section through the fire-chamber in the plane indicated by the line *x x* of Fig. 1. Fig. 3 represents a transverse vertical section through one of the reverberatory chambers in the plane indicated by the line *y y* of Fig. 1.

Similar letters of reference in each of the several figures indicate corresponding parts.

To enable others skilled in the art to make and use my invention, I will proceed to describe its construction and operation.

A A are two arched fire-chambers arranged side by side, furnished with grates *a a*, and having ash-pits B B provided below the said grates. These fire-chambers are not placed beneath the boiler H, but directly in front thereof and longitudinally parallel therewith. They may, however, be placed at one side of the boiler, and at any angle to it. Each is provided with the usual door, *b*, but these are only used for lighting the fires; and the ash-pits are provided with doors *c* to regulate the supply of air through the grates and permit the clearing out of ashes. In the top of each chamber there are openings *d d* for supplying the fuel to the furnaces. The fire-chambers are covered with a flat floor, built over the arches, that the fuel may be wheeled to the feeders in barrows, or brought in any other convenient manner. This floor and the fire-chamber arches are about eighteen inches thick from the crown of the fire-chamber to the top surface, and on either side of the feeding-openings *d* I form between the arches and the floor dead chambers $d^2$, which are fitted with ashes or other material which will prevent the heat of the arches from penetrating through the floor, and thus the latter is always kept cool for the engineer and workmen, which is a great advantage in this form of furnace. The dimensions of the fire-chambers which I have found to produce the best results with wet tan are, in height, three feet, four feet wide, and eight feet long, and the lids of the feeders should be set in the openings *d* near the crown of the arch, so as to keep the heat in the chambers as much as possible. The boiler is supported directly upon the rear wall of the furnace and is outside of and elevated above the fire-chamber, so that the heat issuing therefrom is caused to impinge directly upon the boiler. This is practically the successful feature of the furnace, the results and benefits of which have not hitherto been attained, as the boiler not only receives the heat from the rear wall of the furnace but the entire heat of the fire-chamber is concentrated directly upon it in a chamber where the combustion is intensified. The rear end of the boiler is supported upon the wall which forms the diving-flue E, and the heat from the reverberatory chamber is held by said wall close under the rear end of the boiler. At the rear end of each fire-chamber there is a throat-like aperture, *e*, communicating directly with the reservoir C, which is built of brick and lined with fire-brick directly under the front portion of the boiler, and which has a concave bottom, *m*, and convex back, *n*, which are constructed in a *cima-reversa* shape. By having the bottom and back of the reservoir formed in this way the throats *e* are not partially closed up as they would be if the bottom was flat and set inclined. And besides this, the heated products of combustion are made to hug the bottom of the boiler, and, as the draught is at this point, the perfect combustion of partially-ignited gases is effected. The convex back of the reservoir terminates in and serves as a bridge-wall, and has a concave top, so formed as to leave a space, *o*, of but three or four inches between it and the boiler, as shown in Fig. 3 of the drawing. In rear of the bridge-wall *f* there is a series of reverberatory chambers, D D D, two, three, or more, one behind the other, the series extending nearly as far as the rear end of the boiler, and the said chambers being separated from each other by bridge-walls *g g*, and each chamber being provided with one or more doors, *h*, in either or both sides for the purpose of admitting air in small quantities to complete the combustion of the gases from the fire-chambers, or a greater supply to check the draught. The combustion-reservoir is furnished with a door or doors, *h'*, to admit air therein directly in contact with the products of combustion from the fire-chambers to increase their combustion at the point of the greatest heat beneath the boiler. At the rear of the hindmost reverberatory-chamber there is a wall, *g'*, like the bridge-walls *g g*, behind which there is a diving or drop-flue, E, leading to the chimney, and which communicates with the reverberatory-chambers by means of a small opening in the wall *g'* directly beneath the rear end of the boiler. This arrangement of the driving-flue serves two highly important and advantageous purposes—viz., to cause the heat to hug the rear portion of the boiler, and to extinguish the sparks from the furnace; but the manner in which it effects the retention of the heat beneath the rear portion of the boiler causes the latter to be heated nearly uniformly throughout its entire length, a result which could not be attained if the heat was allowed to pass off rapidly at the rear of the flue beneath the boiler, as heretofore. This diving-flue E is formed by means of two walls, $g^1$ and $g^2$, the latter serving the additional purpose of a support for the rear end of the boiler, and the wall $g^1$ constituting the rear side of the rear reverberatory-chamber D, the chimney or smoke-stack being formed outside of the rear wall of the diving-flue, and the two communicating some distance beneath the boiler, as shown in Fig. 1 of the drawing.

The operation of the furnace is as follows: Only the rear portion of the fire-chambers having been filled with wet fuel through the rear feeders *d*, a fire of dry fuel is kindled in their front portions; the doors of the fire-chambers are closed, and the doors of the ash-pits B partially opened for a draught. The fire from the dry fuel soon heats the fire-chambers, and also dries and ignites the tan. The hot ashes falling into the ash-pits heat the same, and soon the whole mass of wet fuel will become heated and a mass of smouldering fire. The fire-chambers being heated to a very high degree, the doors of the ash-pits are nearly closed, and the chambers filled with wet fuel, which piles up on the grates in a conical form, leaving but a comparatively thin layer all around the edges of the grates, so as to allow of a draught through the grate and to burn more readily. The products of combustion pass from the fire-chambers into the reservoir or chamber C in the rear, and under the front end of the boiler, where it comes into contact with a certain amount of atmospheric air, admitted through the doors *h'*, and produces the most intense heat in their union, effecting a more complete consumption of the products of combustion. This union takes place in the reservoir directly under the front of the boiler, and is therefore utilized at the point where it gives out its heat directly upon the same; and without this union of atmospheric air and gases at this point the largest amount of heat would be lost, because it could nowhere else be concentrated with such effect upon the boiler outside of the fire-chambers. The products of this combustion pass over the bridge-walls, into and through the several reverberatory-chambers, in each of which a portion of their heat is absorbed by contact with the boiler, and finally they descend the flue E to the chimney. The effect of the principal portion of my invention, which consists in the arrangement and location of the reservoir C with respect to the boiler and the fire-chambers, is, that the products of combustion and heat are caused to leave the fire-chambers through the throats *e e* in immediate and direct contact with the boiler, and the said chambers and reservoir are consequently caused to be heated to an intense degree, and to give out that intense heat upon the boiler without passing through an intermediate flue, while at the same time the boiler occupies no space within or above the fire-chambers. A very important feature in this furnace is the location of the combustion-reservoir above the fire-chambers, as thereby the products of combustion are not forced out of a natural draught, but merely follow their natural tendency to rise in said reservoir. The door or doors *h'* in the combustion-reservoir C serve to admit any desired quantity of atmospheric air to this reservoir or chamber, and the amount admitted may be, as is required by different circumstances, regulated by the opening or closing of said doors; and thereby affords not only a very convenient but a very durable and cheap means of effecting this. At night, or any time when no steam is required from the boiler, or when high heat is not required, the two front feeders should be filled up with fresh fuel, the ash-pit doors closed up, and one or more of the doors *h h* in the reverberatory-chambers opened to stop the draught beneath the boiler, and the fire will smoulder and keep in such a degree of heat that on the doors *h h* being closed and the ash-pit doors being opened the fires will instantly burn bright, and the boiler heated by the furnaces may be at once ready for operation. The doors *h h* in the reverberatory-chambers, besides being used to admit cool air in sufficient quantity to prevent draught and keep the fire damped, serve also to admit air in more limited quantities to effect the combustion in the reverberatory-chambers of any inflammable gases that may pass the combustion-chamber C.

I do not claim a furnace for burning wet fuel, broadly, nor the use of a series of fire-chambers connecting with the common flue, arranged between the furnace and the boiler, as I am well aware that this has been done before.

Having described my invention, I claim—

1. In a furnace for burning wet fuels, having two or more single fire-chambers not arranged under the boiler, the combustion-chamber or reservoir C, arranged above the top of said fire-chambers, and located directly under the front end of the boiler, essentially as described.

2. The *cima-reversa* bottom *m n* of the combustion-chamber or reservoir C, in combination with the narrow throats *e* of the separate fire-chambers, and the narrow exit-flue *o* of the bridge-walls *f*, for the purpose essentially as described.

3. In combination with the combustion-chamber or reservoir C, arranged and located as described, I claim the side door or doors *h'*, for the admission of atmospheric air, for the purpose described.

4. In combination with a series of fire-chambers, A, and the combustion-chamber or reservoir C, located and arranged directly beneath the front end of the boiler, and above the crown of said fire-chamber, I claim a series of reverberatory-chambers, D, provided with side doors *h* and a diving-flue, E, at the rear end of the boiler to hold the heat beneath the same throughout its entire length, and to arrest and deaden the sparks, as described.

5. In a furnace for burning wet fuels in which the fire-chambers are not arranged under the boiler I claim the arrangement of the boiler upon the rear wall of the furnace and the rear wall of the diving-flue E for the purpose of obtaining the full advantage of the heat of the walls of the furnace and of the diving-flue, as described.

6. In a furnace for burning wet fuels, having a flat top, and supplied through openings therein, I claim the dead chambers arranged between the floor and the arches of the fire-chambers, for the purpose of maintaining the top of the furnace cool for the workman, as described.

Witnesses: GIDEON BANTZ.
A. E. H. JOHNSON,
ALEXR. A. C. KLAUCKE.